Patented Nov. 7, 1933

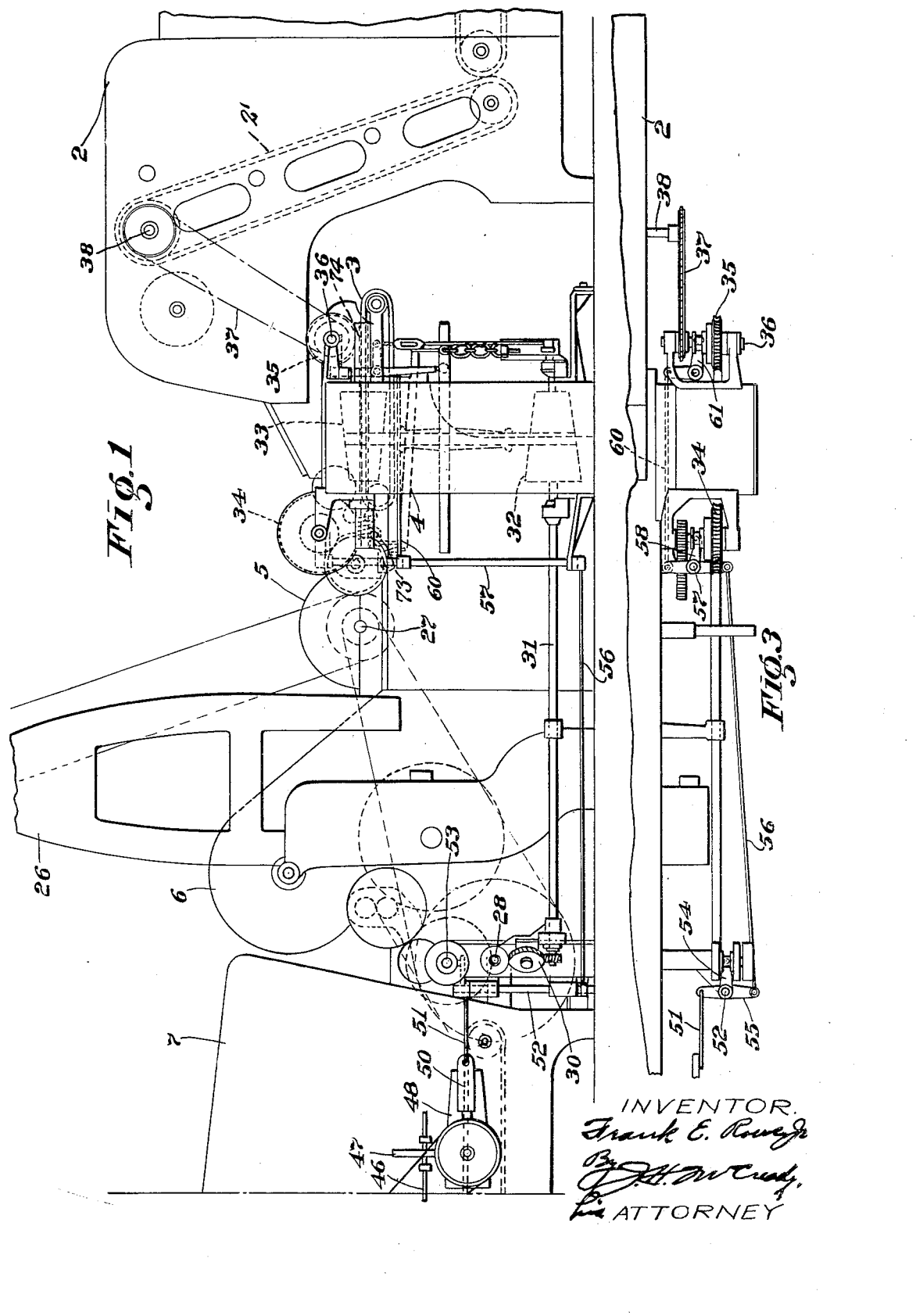

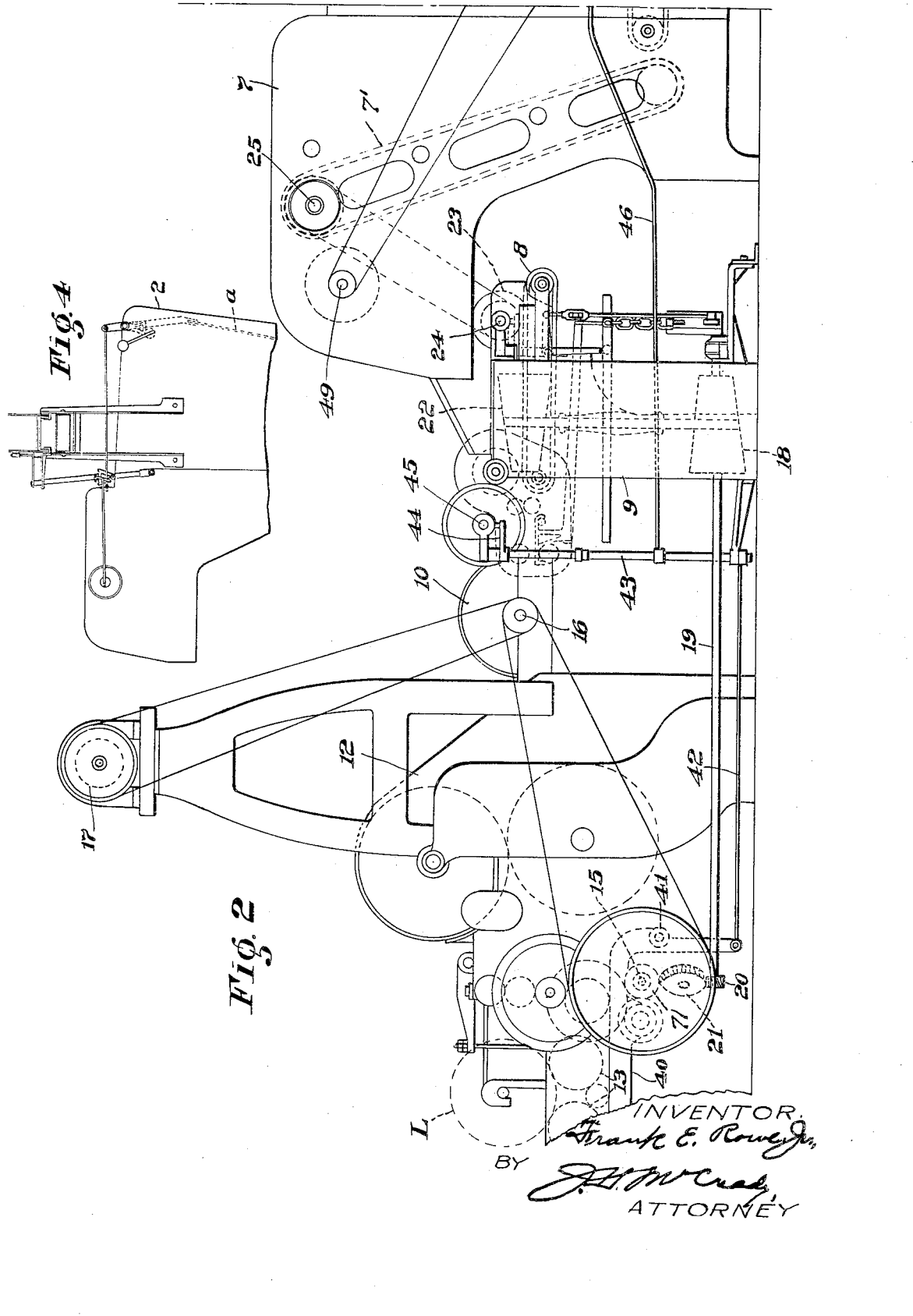

1,933,599

UNITED STATES PATENT OFFICE 1,933,599

PICKER SYSTEM AND PROCESS

Frank E. Rowe, Jr., Winchester, Mass., assignor, by mesne assignments, to Saco-Lowell Shops, Boston, Mass., a corporation of Massachusetts Application January 21, 1928. Serial No. 248,363

14 Claims. (Cl. 19—68)

This invention relates to the preparation of cotton for carding and more especially to the processes and mechanisms for picking cotton, it being understood that the term "cotton" is used in a generic sense to include other fibrous materials which can be handled in essentially the same manner and by substantially the same mechanisms.

According to the usual practice cotton is fed to a carding machine from a lap, and in order to produce thread or yarn having a high degree of uniformity, it is essential that the lap itself be very even or uniform. The preparation of the cotton begins with the bale breaking operation where the bales of cotton are opened, the cotton is pulled out and thrown in bunches on to the lattice of a bale breaker. Cotton of different grades usually are brought together at this point and mixed in order to produce a final product having the desired characteristics. From the bale breaker the cotton passes through two or more opening machines, a typical installation including a vertical opener from which the cotton passes from the bale breaker, and a horizontal cleaner to which the cotton is delivered from the opener. The partially opened cotton is then transferred to the picker room where it is distributed automatically to the feed hoppers of the picker machines, usually by a Morton distributor.

The pickers loosen the fibre and clean the cotton, and each picker usually is equipped with a condenser and with mechanism for producing a lap, such a machine often being referred to as a lapper. The rolls or laps produced in the first picking operation are customarily taken to an "intermediate lapper" in which the laps are unwound, the webs from four laps being superposed on each other or "doubled" so that the irregularities in the individual webs are averaged, and a composite web having less average variation is produced. This web is fed to the beater of the intermediate lapper. The laps made in this machine are considerably more uniform than those produced in the first picker or lapper, and in some mills no further picking operations are performed on the cotton, but the laps go directly from the intermediate lapper to the cards. Usually, however, the laps are taken from the intermediate lapper to a finisher lapper where they are again doubled as in the intermediate machine. This is the usual "three process" picker system.

It should be noted that in a system of the character just described no manual handling of the cotton is required between the bale breaker and the production of the lap by the first picker or lapper. That is, the cotton is fed pneumatically from the bale breaker through the opening machines to the distributing belt of the morton distributor. A single distributor supplies several pickers, as is well understood by those skilled in this art, the distribution being effected automatically in accordance with the requirements of the individual pickers. It is necessary, however, to transfer the laps manually from one picker to the next, and this fact involves considerable manual labor.

The present invention aims to reduce the manual handling required in the picking operation, to devise a continuous system in which the picking operation will be completed without interruption and in a single process, and to provide a system in which the cotton will be maintained in a loose condition until the finished lap is produced. Considered from another standpoint it is an object of this invention to devise a picker system in which the intermediate production of laps and the doubling operations will be avoided, while at the same time reducing the manual handling of the cotton and producing a finished lap which will have at least as high a degree of uniformity as laps produced by prior picker processes. The invention involves both a novel system and also a new process.

The nature of the invention will be readily understood from the following description when read in connection with the accompanying drawings, and the novel features will be particularly pointed out in the appended claims.

In the drawings,

Figures 1 and 2 are side elevations showing successive and connected portions of a series of machines forming a picker system constructed in accordance with this invention;

Fig. 3 is a plan view showing parts of the driving mechanism for the units shown in Fig. 1; and Fig. 4 is a side view of the first feeder hopper in the series of machines shown in Fig. 1.

The system shown comprises a hopper feeder 2 of a common type, this hopper preferably being arranged to receive its supply of cotton from a Morton distributor, and being equipped with the usual mechanism for automatically controlling the discharge of cotton to the hopper from the conveyor belt of the distributor. This control mechanism includes a feeler fork $a$, Fig. 4, and the usual mechanism which is well known in this art for enabling this feeler fork to control the shifting of the gate which diverts cotton from the belt into the hopper. As usual, the arrangement is such that when the supply of cotton in the hopper drops below a substantially predetermined level the feeler fork will be swung forward, thus causing the gate to swing across the conveyor belt and divert cotton into the hopper 2. The increased weight of cotton acting on the feeler fork swings it back to its original position, thus causing the gate to close again and stop the delivery of cotton. The hopper also is equipped with the usual feed lattices 2', and it delivers cotton continuously to a travelling apron or belt 3, Fig. 1, which, in turn, carries this cotton to the rolls of an evener mechanism, indicated in general at 4. From these rolls the cotton passes into a beater 5 of the first picker unit and thence into a screen section or condenser 6. The web of cotton issuing from this condenser is delivered continuously to a second hopper feeder 7 in any conventional or suitable manner, this feeder 7 being also equipped with the usual feed lattices 7' which deliver the cotton to a travelling apron or conveyor belt 8. The belt carries this cotton to the feed rolls of a second evener mechanism, indicated in general at 9, which deliver it to the beater 10 of another picker unit consisting of a lapper. The cotton passes from the beater through the screen section 12 and through the usual calendar rolls to the winding rolls 13—13 which wind it up to produce the lap L, Fig. 2.

Any desired number of picker units may be used in this system, but for purposes of simplicity only two picking machines have been shown, the number used depending upon the nature of the fibrous materials being treated and the results desired.

An important feature of this invention resides in the fact that the cotton passes through an evener before it is delivered to the intermediate hopper 7, and then passes through another evener before it is delivered to the lapper. Preferably, also, the cotton passes through at least one beater before it is delivered to the hopper 7, and often times it will be found desirable to use more than one beater at one side or the other of the intermediate hopper. The first evener mechanism 4 produces a rough evening operation so that the cotton is delivered to the first beater and to the hopper 7 with a considerable degree of uniformity. This intermediate hopper acts as a reservoir to smooth out the flow of cotton through the entire system, absorbing irregularities in the flow. When the system is in operation the extreme variation in level of cotton in the hopper 7 will be relatively small due to the fact that the cotton passes through an evener on its way to the hopper. In other words, an approximately constant quantity of cotton will be maintained continuously in the hopper 7. Consequently, the feed lattice in this hopper will discharge cotton from the hopper at a far more uniform rate than would be the case if greater variations in level were permitted. This reduces the variation in the feed of cotton to the second evener 9 and consequently enables this evener to produce more uniform results than otherwise would be possible, the net result being that there is very little variation in the rate of discharge of cotton to the lapper. This, in turn, means that the laps produced by this machine will have a high degree of evenness or uniformity. A typical lap weighs forty-eight (48) pounds, and variations of less than one-half (½) a pound above or below this figure are considered entirely permissible. Manual control over the rate of feed of cotton to the hopper 7 and that from said hopper is afforded by the adjustability of the two eveners 4 and 9.

When a lap has been completed it is necessary to stop the lapper in order to take out the completed lap and put into the machine the bar or core on which a new lap is to be wound. This stopping operation is performed automatically by the usual knock-off mechanism. It is evident that when such a shut down occurs the entire feeding of cotton from the hopper 2 toward the lapper should be stopped. Also, that when the lapper is again started up the cotton feeding mechanisms should be started simultaneously throughout the entire system. A further feature of this invention involves an organization whereby this result is accomplished.

Referring to Fig. 2 it will be observed that the main shaft 15 from which the calendar rolls and winding rolls of the lapper are driven is itself driven by a belt connection to the beater shaft 16, this shaft being driven at a substantially constant speed from the motor 17. The driving cone 18 of the evener mechanism 9 is mounted on a horizontal shaft 19 which carries a spur gear 20 meshing with an angularly disposed spiral gear 21 which is driven from another spur gear 71 mounted fast on the shaft 15, this mechanism being like that shown in Patent No. 1,397,244. The shaft of the driven cone 22, Fig. 2, of the evener mechanism 9 drives a worm wheel 23 on a shaft 24, the latter shaft being belted or chain connected with the lattice driving shaft 25 in the intermediate hopper feeder 7. This driven cone 22 is similarly connected with the shaft 45 which drives the other cotton feeding elements. The arrangement may be like that customarily used heretofore in evener mechanisms.

The drive for the various units shown in Fig. 1 is derived from a motor (not shown) similar to the motor 17, mounted on the stand 26 and operating at substantially a constant speed. This motor is belt connected to the shaft 27 of the beater 5. The latter shaft also is belt connected to the shaft 28 which drives various cotton feeding units associated with the condenser 6, including the feeding mechanism which delivers the cotton from the condenser to the intermediate hopper 7. Another angular driving mechanism 30, like that shown in Patent No. 1,397,244, connects the shaft 28 with a horizontal shaft 31 which carries the driving cone 32 of the evener mechanism 4. The upper cone 33 of this mechanism carries two worms, one of which, 73, drives a worm wheel 34 for the operation of the feed rolls for the evener and the feeding of the apron 3, while the other, 74, drives a worm wheel 35 which is connected through a clutch to the shaft 36. This shaft is connected by a belt or chain 37 to the lattice driving shaft 38 of the feed hopper 2.

The usual knock-off mechanism for the lapper includes a drop bar 40, Fig. 2, which is pivoted or fulcrumed at 41. A rod 42 connects the lower end of this bar or lever with an upright rock shaft 43 which has the usual connections for operating clutches through which the cotton feeding elements associated with the evener 9 are driven. An arm projecting from the rock shaft 43 is connected by a rod 46, Figs. 2 and 1, to a control lever 47 of a positively operating unit 48 of the character shown in Patent No. 1,735,135. This unit or mechanism is driven by a belt connection to the doffer shaft 49, Fig. 2, of the feed hopper 7, the latter shaft running constantly. When the drop bar 40 is released it will operate through the connections just described to bring the mechanism or unit 48 into action, this mechanism operating positively to move the slide 50, Fig. 1, toward the left. A rod 51 connects this mechanism with an upright rock shaft 52, and an arm 54, Fig. 3, projecting from this rock shaft is arranged to operate a clutch on the shaft 53 to stop the cotton feeding apparatus associated with the condenser 6. Another arm 55 carried by this rock shaft is connected by a rod 56 to an arm fast on another upright rock shaft 57 which carries an arm 58 arranged to operate a clutch that controls the driving connection between the worm wheel 34 and the shaft on which it rotates. The rock shaft 57 also is connected through a rod 60 to a lever 61 which controls a clutch for operatively connecting the worm wheel 35 with its shaft 36.

It will thus be evident that the operation of the knock-off mechanism for the lapper automatically shuts down all of the feeding mechanisms between the hopper 2 and the lapper. Similarly, when the drop bar 40 is raised again to start the lapper into operation, the feed mechanisms will all be started into operation again automatically and substantially simultaneously. While the clutch operating levers 54, 58 and 61 are not operated directly by the drop bar, they are operated indirectly through the positively acting power driven unit 48, and this unit has provision for automatically interrupting its own action whenever it has moved the slide 50 a predetermined distance either to the right or left.

In order to avoid confusion, the individual machines in the system have been shown somewhat diagrammatically and many of the details of construction have been omitted. However, the units of this system are all well known in this art so that a detailed illustration of them and of some of the driving mechanism for them is unnecessary.

It will be observed that the invention provides a system in which the entire handling of the cotton between the operations of bale breaking and the production of a finished lap are performed automatically and without any manual labor. Also, that the doubling operation has been eliminated and that the results produced by doubling are obtained in a simpler way, namely, by the use of a feed hopper between the two eveners. In this intermediate hopper feeder or reservoir the cotton is accumulated, the integrity of the stream of cotton fed into it is completely lost, and the fiber is so mixed that a better blending of the stock is produced. In this picker system the cotton is maintained in a loose condition until it is worked into a lap at the completion of the picking operation, no calendering of the cotton being performed except at the end of the picking process. This is an advantage not only in simplifying the operations performed and the mechanisms required to perform the entire picking process, but also in reducing the liability of injuring the fibres.

While a typical system has been described and shown in connection with the disclosure of this invention, it will be understood that the invention may be embodied in systems organized somewhat differently and in which other units than those here shown are used without departing from the spirit or scope of the invention. For example, the number of beaters employed may be varied, and a tandem feeder can be substituted for the feeder 7. In fact, considerable variation may be made in the organization of the system while still retaining its essential characteristics.

Having thus described my invention, what I desire to claim as new is:

1. In a single process picker system, the combination of a series of machines arranged to act successively and continuously on a supply of cotton to work it into the form of a lap, said series of machines including a hopper feeder in which the cotton is accumulated and the integrity of the stream of cotton fed thereto is lost, said series of machines also including an evener for acting on the cotton before it is delivered to said hopper feeder.

2. In a single process picker system, the combination of a series of machines arranged to act successively and continuously on a supply of cotton to work it into the form of a lap, said series including two evener mechanisms and a hopper feeder located between said mechanisms.

3. In a single process picker system, the combination of a hopper feeder, means for feeding cotton continuously to said hopper feeder, said means including a picker and an evener mechanism, a lapper, and additional means for feeding cotton continuously from said hopper feeder to said lapper, said additional means including an evener, said eveners being operated independently of each other.

4. In a single process picker system, the combination of a hopper feeder, means for feeding cotton continuously to said hopper feeder, said means including a picker and an evener mechanism, a lapper, and additional means for feeding cotton continuously from said hopper feeder to said lapper, said additonal means including an evener, an automatic knock-off mechanism for said lapper, and connections whereby said knock-off mechanism automatically stops the entire feed of cotton toward said lapper.

5. In a single process picker system, the combination of a hopper feeder, means for feeding cotton continuously to said hopper feeder, said means including a picker and an evener mechanism, a lapper, additional means for feeding cotton continuously from said hopper feeder to said lapper, said additional means including an evener, an automatic knock-off mechanism for said lapper, said mechanism being operable to start the lapper into operation again, and means for connecting said lapper and said knock-off mechanism with the other units of the system whereby the stopping of the lapper automatically stops the feeding of cotton through said system and the starting of said lapper automatically starts the cotton feeding operation again.

6. In a single process picker system, the combination of a hopper feeder equipped with automatic means for controlling the feed of cotton thereto, a picker to which the cotton is fed from said hopper feeder, an evener mechanism between said picker and said hopper feeder, a second hopper feeder arranged to receive the cotton continuously from said picker, a lapper, and means including an evener mechanism for feeding the cotton continuously from said second hopper feeder to said lapper.

7. That improvement in processes of picking cotton and the like, which consists in subjecting the cotton to a plurality of picking operations, and finally working it into the form of a lap, passing the cotton continuously from one operation to the next, feeding the cotton through a reservoir in which the cotton is accumulated and the integrity of the stream of cotton fed thereto is lost to reduce the variations in the flow of the cotton from one picking operation to another, and evening the cotton before it is delivered to said reservoir.

8. That improvement in processes of picking cotton and the like, which consists in subjecting the cotton to a plurality of picking operations and finally working it into the form of a lap, feeding the cotton continuously from one operation to the next, maintaining the cotton in a loose condition throughout the picking process and until the final operation of lapping, between certain of the picking operations feeding the cotton through a reservoir in which the cotton is accumulated and the integrity of the stream of cotton fed thereto is lost evening the cotton before it is delivered to said reservoir, and maintaining the supply of the cotton in the reservoir substantially constant.

9. That improvement in processes of picking cotton and the like, which consists in subjecting the cotton to a plurality of picking operations and finally working it into the form of a lap, feeding the cotton continuously from one operation to the next, feeding the cotton through a reservoir in passing from one operation to another, and evening the cotton both before it is delivered to said reservoir and after it is fed out of said reservoir.

10. In a single process picker system, the combination of a hopper feeder, means for feeding cotton continuously to said hoper feeder, said means including a picker and an evener mechanism, a lapper, an automatic knock-off mechanism for said lapper, a power driven unit 48 under the control of said knock-off mechanism, connections whereby said unit is operable to stop said feeding means or to start it into operation again, and additional means for feeding cotton continuously from said hopper feeder to said lapper, said additional means including an evener.

11. In a single process picker system, the combination of a series of machines arranged to act successively and continuously on a supply of cotton to work it into the form of a lap, said series of machines including a plurality of pickers and two hopper feeders, one of said pickers being located between said hopper feeders, the second of said hopper feeders being operative to accumulate the cotton therein and the integrity of the stream of cotton fed thereto being lost in said second hopper feeder, and an evener mechanism for acting on the cotton as it is advanced from one of said hopper feeders to the next.

12. In a single process picker system, the combination of a hopper feeder equipped with automatic means for controlling the feed of cotton thereto, a picker to which the cotton is fed from said hopper feeder, an evener mechanism between said picker and said hopper feeder, a second hopper feeder arranged to receive the cotton continuously from said picker and in which the cotton is accumulated and the integrity of the stream of cotton fed thereto is lost, a lapper, and means for feeding the cotton continuously from said second hopper feeder to said lapper.

13. That improvement in processes of picking cotton and the like, which consists in subjecting the cotton to a plurality of picking operations, passing the cotton continuously from one operation to the next, feeding the cotton through a reservoir in which the cotton is accumulated and the integrity of the stream of cotton fed thereto is lost to reduce the variations in the flow of the cotton from one picking operation to another, and so controlling the feed of cotton to and from said reservoir as to maintain the supply of cotton in the reservoir substantially constant.

14. In a picker system, the combination of a plurality of beater sections through which the cotton is fed in a continuous stream, a hopper located between the first beater section and the last beater section and in which the cotton dwells and accumulates during its passage from the first to the last beater section, mechanisms for feeding the cotton from said hopper to the next succeeding beater section, an evener mechanism controlling the operation of said feeding mechanism, and means for feeding the cotton to the first beater section including an evener mechanism adjustable with relation to the first mentioned feeding mechanism to regulate the feed of cotton to the first beater section at a rate approximately equal to the normal rate of delivery from said intermediately located hopper.

FRANK E. ROWE, Jr.